US010084913B2

(12) United States Patent
Montenegro et al.

(10) Patent No.: US 10,084,913 B2
(45) Date of Patent: Sep. 25, 2018

(54) SENTIMENT MANAGEMENT SYSTEM

(71) Applicant: Wells Fargo Bank, N.A., San Francisco, CA (US)

(72) Inventors: Dennis Emmanuel Montenegro, Concord, CA (US); Prasanth Nandanuru, Hyderabad (IN); Pavan Kumar Arln, Hyderabad (IN); Yejjala Yevanna, U.Kothapalli Mandal (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 14/461,915

(22) Filed: Aug. 18, 2014

(65) Prior Publication Data
US 2016/0048502 A1 Feb. 18, 2016

(51) Int. Cl.
*H04M 3/00* (2006.01)
*H04M 3/51* (2006.01)
*G06Q 30/00* (2012.01)

(52) U.S. Cl.
CPC ............ *H04M 3/51* (2013.01); *G06Q 30/016* (2013.01); *H04M 3/5166* (2013.01); *H04M 2203/558* (2013.01)

(58) Field of Classification Search
CPC .................................................. H04M 3/523
USPC ....... 379/265.01–265.14, 266.01–266.1, 309
See application file for complete search history.

(56) References Cited

U.S. PATENT DOCUMENTS

| 7,720,835 | B2 | 5/2010 | Ward et al. |
| 8,375,024 | B2 | 2/2013 | Goeldi |
| 8,447,852 | B1 | 5/2013 | Penumaka et al. |
| 8,463,595 | B1 | 6/2013 | Rehling et al. |
| 8,478,652 | B2 | 7/2013 | Tuchman et al. |
| 8,504,408 | B2 * | 8/2013 | Banthia .................. G06Q 30/02 705/7.29 |
| 8,600,019 | B1 * | 12/2013 | Cooper ............... H04M 3/4936 379/118 |
| 9,129,290 | B2 * | 9/2015 | Kannan .................. G06Q 30/02 |
| 9,384,493 | B2 * | 7/2016 | Harris ................ G06Q 30/0201 |
| 9,418,389 | B2 * | 8/2016 | Chandrasekaran .... G06Q 50/01 |
| 2007/0138268 | A1 * | 6/2007 | Tuchman ............... G06Q 30/02 235/383 |
| 2011/0320373 | A1 | 12/2011 | Lee et al. |
| 2012/0011425 | A1 * | 1/2012 | Banker ............. G06F 17/30014 715/205 |
| 2012/0047219 | A1 | 2/2012 | Feng et al. |
| 2012/0072358 | A1 | 3/2012 | Famous et al. |

(Continued)

OTHER PUBLICATIONS

Lohr, "The Age of Big Data", The New York Times Sunday Review/The Opinion Pages, Published Feb. 11, 2012, downloaded from: http://www.nytimes.com/2012/02/12/sunday-review/big-datas-impact-in-the-world.html?pagewanted=all/&_r=0 (3 pages).

(Continued)

*Primary Examiner* — William Deane, Jr.
(74) *Attorney, Agent, or Firm* — Merchant & Gould P.C.

(57) ABSTRACT

A method of managing customer sentiment includes: monitoring an interaction of a customer with customer interactive media; deriving a sentiment of the customer from the interaction of the customer with the customer interactive media; generating sentiment data for the customer; and updating customer data in a customer database with the sentiment data in real-time.

18 Claims, 7 Drawing Sheets

(56) References Cited

U.S. PATENT DOCUMENTS

| | | | |
|---|---|---|---|
| 2012/0232953 A1 | 9/2012 | Custer | |
| 2012/0254060 A1 | 10/2012 | Choudhary et al. | |
| 2012/0278064 A1 | 11/2012 | Leary et al. | |
| 2012/0278253 A1 | 11/2012 | Gahlot et al. | |
| 2012/0316916 A1* | 12/2012 | Andrews | G06Q 40/08 705/7.28 |
| 2013/0035983 A1 | 2/2013 | Kursar et al. | |
| 2013/0054479 A1 | 2/2013 | Ross et al. | |
| 2013/0073336 A1 | 3/2013 | Heath | |
| 2013/0124653 A1 | 5/2013 | Vick et al. | |
| 2013/0166379 A1 | 6/2013 | Ehindero et al. | |
| 2013/0166457 A1 | 6/2013 | Du et al. | |
| 2013/0173269 A1 | 7/2013 | Adler et al. | |
| 2013/0191455 A1* | 7/2013 | Penumaka | H04L 67/02 709/204 |
| 2013/0204871 A1* | 8/2013 | Wong | G06F 17/30867 707/732 |
| 2013/0231920 A1 | 9/2013 | Mathew et al. | |
| 2013/0231974 A1* | 9/2013 | Harris | G06Q 30/0201 705/7.29 |
| 2013/0232159 A1* | 9/2013 | Daya | G06Q 50/01 707/758 |
| 2013/0282417 A1 | 10/2013 | Gaedcke et al. | |
| 2013/0282430 A1* | 10/2013 | Kannan | G06Q 30/06 705/7.29 |
| 2014/0032259 A1* | 1/2014 | LaFever | G06Q 30/0201 705/7.29 |
| 2014/0164398 A1* | 6/2014 | Smith | G06F 17/3053 707/748 |
| 2014/0358888 A1 | 12/2014 | Whitelaw et al. | |
| 2014/0365305 A1* | 12/2014 | Arditi | G06Q 30/0261 705/14.58 |
| 2015/0012331 A1* | 1/2015 | Carter | G06Q 30/0201 705/7.29 |
| 2015/0066672 A1* | 3/2015 | Swamynathan | G06Q 30/0603 705/26.1 |
| 2015/0100377 A1* | 4/2015 | Penumaka | G06Q 30/0201 705/7.29 |
| 2015/0170183 A1* | 6/2015 | Santaella | G06Q 30/0226 705/14.27 |
| 2015/0170191 A1* | 6/2015 | Santaella | G06Q 30/0227 705/14.3 |
| 2015/0172145 A1* | 6/2015 | Skiba | H04L 67/10 709/224 |
| 2015/0206092 A1* | 7/2015 | Erhart | G06Q 10/06311 705/7.15 |
| 2015/0206155 A1* | 7/2015 | LaFever | G06Q 30/0201 705/7.29 |
| 2015/0235143 A1* | 8/2015 | Eder | G06F 19/3437 706/12 |
| 2015/0302304 A1* | 10/2015 | Monden | G06F 17/241 706/12 |
| 2015/0302315 A1* | 10/2015 | Ahn | G06N 5/04 706/46 |
| 2015/0371278 A1* | 12/2015 | Soni | G06Q 30/0269 705/14.66 |
| 2016/0034973 A1 | 2/2016 | Soni et al. | |
| 2016/0042359 A1* | 2/2016 | Singh | G06Q 30/016 704/2 |
| 2016/0048872 A1* | 2/2016 | Sanchez | G06Q 30/0255 705/14.53 |
| 2016/0055250 A1 | 2/2016 | Rush | |
| 2016/0232546 A1 | 8/2016 | Ranft et al. | |
| 2017/0262901 A1* | 9/2017 | Jain | G06Q 30/0276 |

OTHER PUBLICATIONS

Melville et al., Social Media Analytics: Channeling the Power of the Blogosphere for Marketing Insight, downloaded from: http://people.cs.uchicago.edu/~vikass/sma-win09.pdf, published in 2009 (5 pages).

Social Media Monitoring made easy with Sysomos, downloaded from: http://www.sysomos.com/social-media-monitoring, published on Nov. 23, 2013 (tracked by Wayback Machine on Nov. 18, 2014) (5 pages).

Customer Interaction AnalyticsTM—A 360° Approach for Analyzing the Voice of the Customer Across Multiple Communications Channels, downloaded from: http://crmxchange.com/uploadedFiles/Featured_White_Papers/PDF/Cust_Interaction_Analy_WP_010311.pdf, Published 2011 Verint Systems, Inc. (22 pages).

Machine Learning Techniques: Predictive Modeling, Data Analytics, and Artificial Intelligence, Machine Learning Research, downloaded from: http://www.machinelearningtechniques.com/index.php, published on Jul. 5, 2013 (tracked by Wayback Machine on Nov. 18, 2014) (6 pages).

Stodder "Customer Analytics in the Age of Social Media", downloaded from: http://citia.co.uk/content/files/customer-analytics-in-the-age-of-social-media_40085059.pdf, published in 2012 (42 pages).

* cited by examiner

SENTIMENT MANAGEMENT SYSTEM

BACKGROUND

In some applications, sentiment analysis is used to extract the attitude of a speaker or a writer with respect to a given topic. The sentiment analysis typically classifies the polarity of a given text. For example, the sentiment analysis can be used to determine whether the expressed opinion in the document or sentence is positive, negative, or neutral.

SUMMARY

In general terms, this disclosure is directed to a sentiment management system for customer service. In one possible configuration and by non-limiting example, the sentiment management system monitors a customer's interactions with different customer interactive media, derives customer sentiment, and updates a customer database with the customer sentiment in real-time so that service employees retrieve the customer sentiment as needed to perform individualized customer service. Various examples are described in this disclosure, which include, but are not limited to, the following aspects.

In one aspect, a method of managing customer sentiment includes: monitoring an interaction of a customer with customer interactive media; deriving a sentiment of the customer from the interaction of the customer with the customer interactive media; generating sentiment data for the customer; and updating customer data in a customer database with the sentiment data in real-time.

In another aspect, a system of managing customer sentiment for customer service includes: a processing device configured to control a sentiment analysis engine; a customer database configured to store customer data; and a computer readable storage device storing software instructions that, when executed by the processing device, cause the sentiment analysis engine to: monitor an interaction of a customer with customer interactive media; derive a sentiment of the customer from the interaction of the customer with the customer interactive media; generate sentiment data for the customer; and update customer data in a customer database with the sentiment data in real-time.

In yet another aspect, a computer-readable storage medium includes software instructions that, when executed, cause a parameter measuring device to: receive a request for registering information about customer interactive media; monitor an interaction of a customer with the customer interactive media by detecting a customer interactive media post generated by the customer and relevant to a predetermined service provided for the customer; verify an identity of the customer based upon customer data stored in a customer database; derive a sentiment of the customer from the interaction of the customer with the customer interactive media; generate sentiment data for the customer; update customer data in a customer database with the sentiment data in real-time; generate a predictive model for customer service based upon the sentiment data in real-time, the predictive model configured to suggest possible actions to be taken for the customer; receive a request of an operator for retrieving the customer data from the customer database; display the customer data to the operator, the customer data including the sentiment data and the suggested possible actions; and generate an alert to the operator, the alert including information about the sentiment data for the customer in real-time.

DETAILED DESCRIPTION

Figure 1:
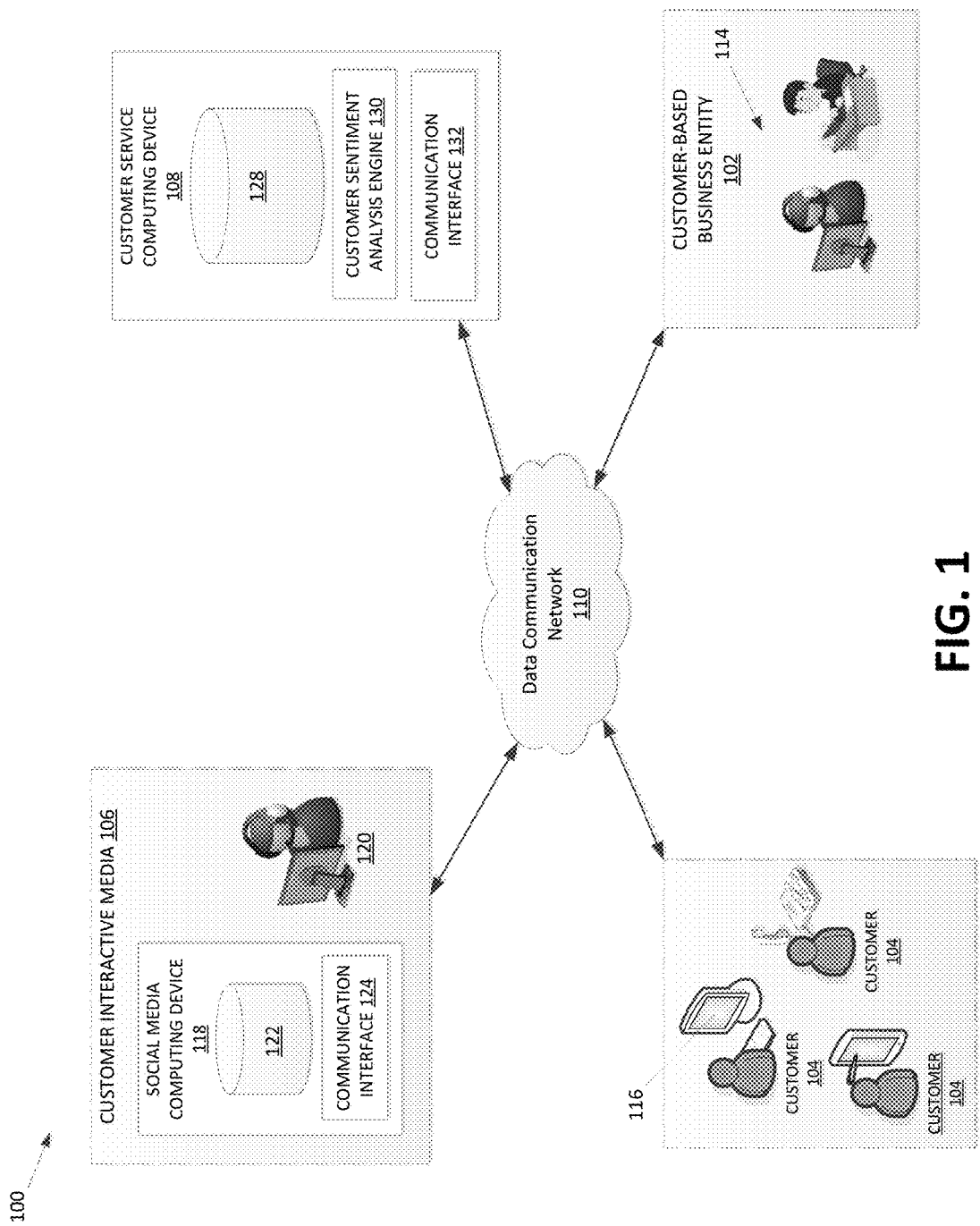
FIG. 1 illustrates an example system for managing customer sentiment for customer service.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates an example system 100 for managing customer sentiment for customer service in real-time. The system 100 includes a customer-based business entity 102, at least one customer 104, at least one customer interactive media 106, a customer service computing device 108, and a data communication network 110.

In some embodiments, the customer sentiment is the measurement of the customer's feelings or attitudes (e.g., positive, negative or neutral) toward the products and/or services purchased or provided by the business entity 102. The level of customer sentiment can be referred to as a primary factor in determining the level of customer service to the customers 104.

In examples described herein, the customer sentiment is monitored in real-time. This real-time monitoring is configured so that sentiment is derived in sufficient time so that action can be taken to address neutral or negative sentiment. For example, real-time monitoring can include a determination of negative sentiment and alerting that allows customer service to identify and address those negative sentiments before the customer expresses further negative sentiments and/or makes a decision to end his or her relationship with the business entity. Through real-time monitoring, the undesired sentiments can be addressed before such sentiments become a larger problem for the business entity.

The customer-based business entity 102 is an organization involved in the trade of goods and/or services to the customers 104. In addition to providing goods and/or services to the customers 104, the customer-based business entity 102 provides customer service before, during and/or after the customers 104 purchase the goods and/or services. Customer service is designed to enhance satisfaction of the customers 104, as well as meet expectations of the customers 104.

In one example described herein, the business entity 102 is a financial institution. However, in other examples, the business entity can be any type of business that provides goods or services to customers.

In some embodiments, the business entity 102 has service employees 114 who perform customer service to the customers 104 based upon analyzed sentiment information for the customer 104, as described below. The service employees 114 include people who work for the business entity 102, such as employees and independent contractors. In some embodiments, the service employees 114 are salespersons, customer support personnel, or other people who interact with the customers 104.

The customer 104 is a purchaser of the goods and/or services provided by the business entity 102. The customer 104 can include a potential purchaser of the goods and/or services of the business entity 102. The customer 104 has a customer experience while interacting with the business entity during the purchase of the goods and/or services. Customer experience includes all experiences the customer 104 has with a supply of goods and/or services over the duration of his or her relationship with the business entity 102. The customer experience can include awareness, discovery, attraction, interaction, transaction, purchase, use, cultivation and advocacy in relation to the goods and/or services involved.

Appropriate and well-designed customer service can promote the customer experience for the goods and/or services provided by the business entity 102. For example, customer service individualized for a particular customer 104 can maintain and/or enhance the personal experience or perception of the customer 104 about the goods and/or services purchased, as well as about the business entity 102.

The customer 104 can use different types of communication devices 116 to communicate with the customer interactive media 106 and express or share the customer experience thereon. Examples of communication devices 116 include a laptop computer, a telephone, a cellphone, a smart phone, a tablet computer (e.g., an iPad® mobile digital device), an iPod® mobile digital device, or other communication devices configured to process analog or digital instructions.

The customer interactive media 106 are media in which the customers 104 can provide explanations of their customer experience, such as negative or positive experiences with the products and/or services provided by the business entity 102. Examples of the customer interactive media 106 include social media computing devices 118 and customer service centers 120.

The social media computing devices 118 operate to allow for social interaction among people in which they create, share or exchange information and ideas in virtual communities and networks. The social media computing devices 118 include a group of internet-based applications that allow the customers 104 to generate and exchange user-generated content. The social media computing devices 118 can have different forms including internet forums, blogs, microblogging, wikis, social networks, podcasts, and/or social bookmarking, to name a few. A blog is a discussion or information site published on the World Wide Web and consisting of posts. A microblog is a blog in which people exchange small elements of content such as short sentences, individual images, or video links. Examples of microblogging sites include Twitter™, Tumblr™, or the like. A wiki is a web application which allows people to add, modify, or delete content in collaboration with others. Examples of the wiki include Wikipedia™. A social networking service is a platform to build social networks or social relations among people who share interests, activities, backgrounds or real-life connections. Examples of the social networking sites include Facebook™, MySpace™, Linkedin™, Diaspora™, Google+™, YouTube™, Instagram™, Pinterest™, or the like. A social bookmarking service is a centralized online service which enables users to add, annotate, edit, and share bookmarks of web documents.

In some embodiments, the social media computing device 118 includes a social media database 122 and a communication interface 124.

The social media database 122 is a data storage device configured to store a variety of information. Examples of the database 122 include a hard disk drive, a collection of hard disk drives, digital memory (such as random access memory), a redundant array of independent disks (RAID), or other data storage devices. In some embodiments information is distributed across multiple local or remote data storage devices. The database 122 stores data in an organized manner, such as in a hierarchical or relational database structure, or in lists and other data structures such as tables. Although the database 122 is illustrated as being a component of the social media computing device 118, in at least some embodiments, the database 122 is separate from the social media computing device 118.

The information stored in the social media database 122 contains customer interactive media content generated and posted by the customer 104. The customer interactive media content includes the customer experience associated with the purchase of the products and/or services from the business entity 102. The interactive media content can include online postings on the social media computing device 118 and telephone conversations to the customer service center 120.

The communication interface 124 is configured to enable the social media computing device 118 to communicate with other devices such as the communication devices 116 of the customers 104 and the customer service computing device 108.

The customer service center 120 is a type of customer interaction center or call center that is equipped to handle a large number of customer telephone requests for the business entity 102. The call center can also deal with additional types of customer communications such as letters, e-mails, faxes, and live chat, in addition to telephone communications. The customer service center 120 can be operated through a workspace for call center agents with work stations including a computer and/or a telephone set/head set connected to a telecom switch.

The customer service computing device 108 operates to capture feedback from the customer 104 about the customer experience and derive customer sentiment from the monitored customer experience. The customer service computing device 108 also operates to interact with the customer interactive media 106 to obtain the customer experience of the customer 104 regarding the products and/or service provided to the customer 104 by the business entity 102. Further, the customer service computing device 108 operates to analyze the customer sentiment about the products and/or services from the obtained customer experience of the customer 104.

As describe further herein, the customer service computing device 108 can capture sentiment from written communications by the customers. In other examples, the computing device 108 can capture sentiment from verbal communications by the customers. For example, the verbal exchange between the customer and a customer service agent can be recorded and transcribed using voice transcription technology. The transcription can then be analyzed in a similar manner to other written communications to determine sentiment of the caller.

In some embodiments, the customer service computing device 108 includes a customer database 128, a customer sentiment analysis engine 130, and a communication interface 132.

The customer database 128 is a data storage device configured to store a variety of information. The configuration of the customer database 128 is similar to the database 122 of the social media computing device 118. The customer database 128 stores customer information. The customer information is information about the customers 104 of the business entity 102 and can be used by the service employees 114 for customer service. In some embodiments, the customer information includes customer profile information, which, for example, includes customer identifications or names, mailing addresses, physical addresses, contact names, telephone numbers, fax numbers, and email addresses. As described below, the customer information further includes sentiment data for customers 104. The sentiment data is generated from sentiments of the customers 104, which are derived from the interaction of the customers 104 with the customer interactive media 106, as illustrated below.

The customer sentiment analysis engine 130 operates to manage customer sentiment of the customers 104 for customer service. An example of the customer sentiment analysis engine 130 is illustrated and described with reference to FIG. 3.

The communication interface 132 is configured to enable the customer service computing device 108 to communicate with other devices such as the customer interactive media 106. The communication interface 132 also operates to allow the service employees 114 to interact with the customer service computing device 108 and retrieve the customer information stored in the customer database 128.

The data communication network 110 communicates digital data between one or more computing devices, such as between the customers 104 and the customer interactive media 106, between the customer interactive media 106 and the customer service computing device 108, and between the customer service computing device 108 and the service employees 114 of the business entity 102. Examples of the network 110 include a local area network, such as an intranet, and a wide area network, such as the Internet.

In some embodiments, the network 110 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as utilizing wireless routers or wireless access points), cellular communication devices (such as utilizing one or more cellular base stations), and other wireless communication devices.

Figure 2:
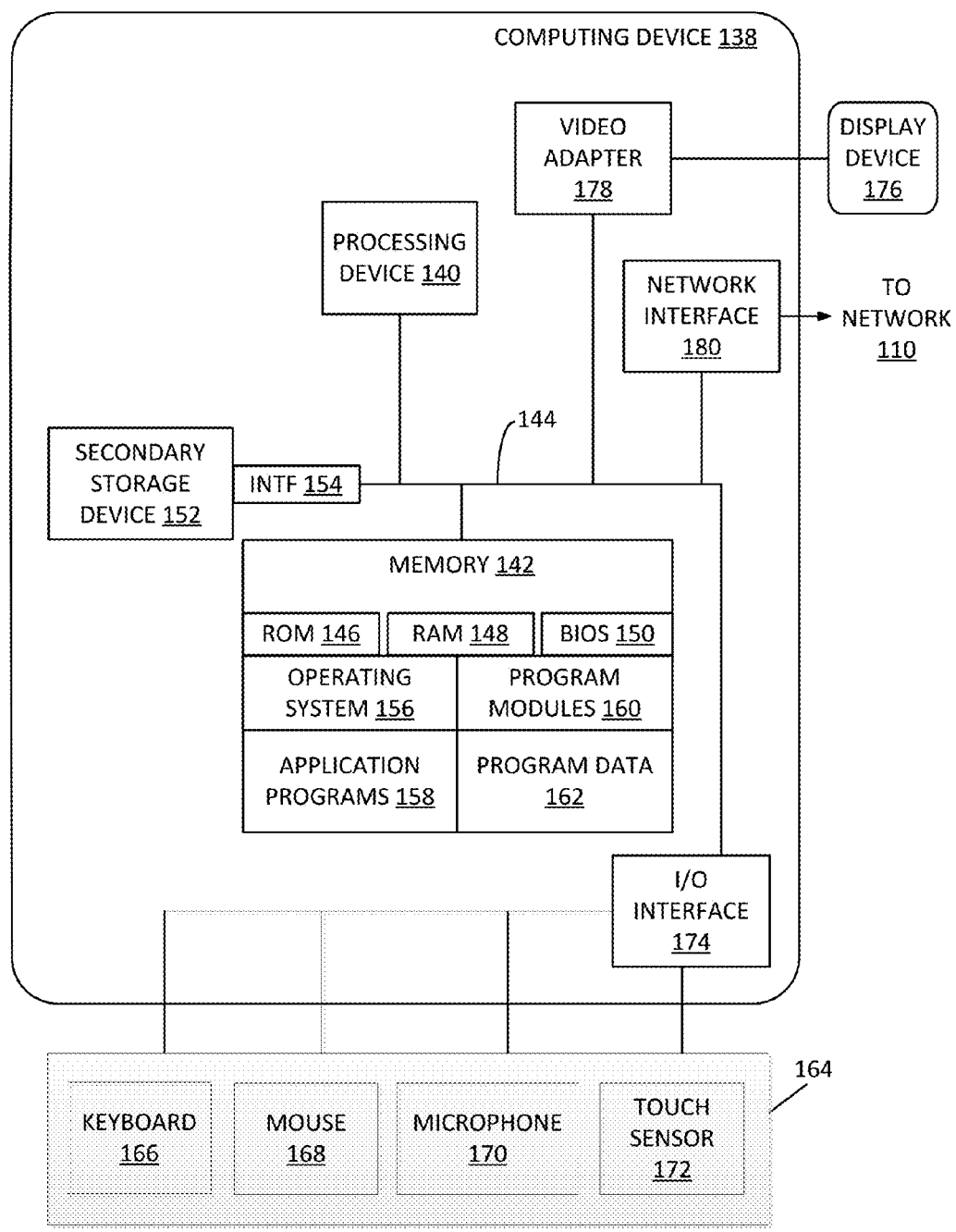
FIG. 2 illustrates an example architecture of a computing device that can be used to implement aspects of the present disclosure.

FIG. 2 illustrates an exemplary architecture of a computing device that can be used to implement aspects of the present disclosure, including the customer interactive media 106, the customer service computing device 108, the communication devices 116 of the customers 104, and the communication devices or computing devices for the service employees 114. All of these computing devices can have common components, such as those illustrated in example computing device 138. One or more computing devices, such as the type illustrated in FIG. 2, are used to execute the operating system, application programs, and software modules (including the software engines) described herein.

The computing device 138 includes, in at least some embodiments, at least one processing device 140, such as a central processing unit (CPU). A variety of processing devices are available from a variety of manufacturers, for example, Intel or Advanced Micro Devices. In this example, the computing device 138 also includes a system memory 142, and a system bus 144 that couples various system components including the system memory 142 to the processing device 140. The system bus 144 is one of any number of types of bus structures including a memory bus or memory controller, a peripheral bus, and a local bus using any of a variety of bus architectures.

Examples of computing devices suitable for the computing device 138 include a desktop computer, a laptop computer, a tablet computer, a mobile phone device such as a smart phone, or other devices configured to process digital instructions.

The system memory 142 includes read only memory 146 and random access memory 148. A basic input/output system 150 containing the basic routines that act to transfer information within computing device 138, such as during start up, is typically stored in the read only memory 146.

The computing device 138 also includes a secondary storage device 152 in some embodiments, such as a hard disk drive, for storing digital data. The secondary storage device 152 is connected to the system bus 144 by a secondary storage interface 154. The secondary storage devices and their associated computer readable media provide nonvolatile storage of computer readable instructions (including application programs and program modules), data structures, and other data for the computing device 138.

Although the exemplary environment described herein employs a hard disk drive as a secondary storage device, other types of computer readable storage media are used in other embodiments. Examples of these other types of computer readable storage media include magnetic cassettes, flash memory or other solid state memory technology, digital video disks, Bernoulli cartridges, compact disc read only memories, digital versatile disk read only memories, random access memories, or read only memories. Some embodiments include non-transitory media.

A number of program modules can be stored in a secondary storage device 152 or a memory 142, including an operating system 156, one or more application programs 158, other program modules 160, and program data 162. The data used by the computing device 138 may be stored at any location in the memory 142, such as the program data 162, or at the secondary storage device 152.

In some embodiments, computing device 138 includes input devices 164 to enable the caregiver to provide inputs to the computing device 138. Examples of input devices 164 include a keyboard 166, pointer input device 168, microphone 170, and touch sensor 172. A touch-sensitive display device is an example of a touch sensor. Other embodiments include other input devices 164. The input devices are often connected to the processing device 140 through an input/output interface 174 that is coupled to the system bus 144. These input devices 164 can be connected by any number of input/output interfaces, such as a parallel port, serial port, game port, or a universal serial bus. Wireless communication between input devices 164 and interface 174 is possible as well, and includes infrared, BLUETOOTH® wireless technology, 802.11a/b/g/n (or future protocols), cellular or other radio frequency communication systems in some possible embodiments.

In this example embodiment, a touch sensitive display device 176 is also connected to the system bus 144 via an interface, such as a video adapter 178. In some embodiments, the display device 176 is a touch sensitive display device. A touch sensitive display device includes sensor for receiving input from a user when the user touches the display or, in some embodiments, or gets close to touching the display. Such sensors can be capacitive sensors, pressure sensors, optical sensors, or other touch sensors. The sensors not only detect contact with the display, but also the location of the contact and movement of the contact over time. For example, a user can move a finger or stylus across the screen or near the screen to provide written inputs. The written inputs are evaluated and, in some embodiments, converted into text inputs.

In addition to the display device 176, the computing device 138 can include various other peripheral devices (not shown), such as speakers or a printer.

When used in a local area networking environment or a wide area networking environment (such as the Internet), the computing device 138 is typically connected to the network through a network interface, such as a wireless network interface 180. Other possible embodiments use other communication devices. For example, some embodiments of the computing device 138 include an Ethernet network interface, or a modem for communicating across the network.

The computing device 138 typically includes at least some form of computer-readable media. Computer readable media includes any available media that can be accessed by the computing device 138. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 138.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Figure 3:
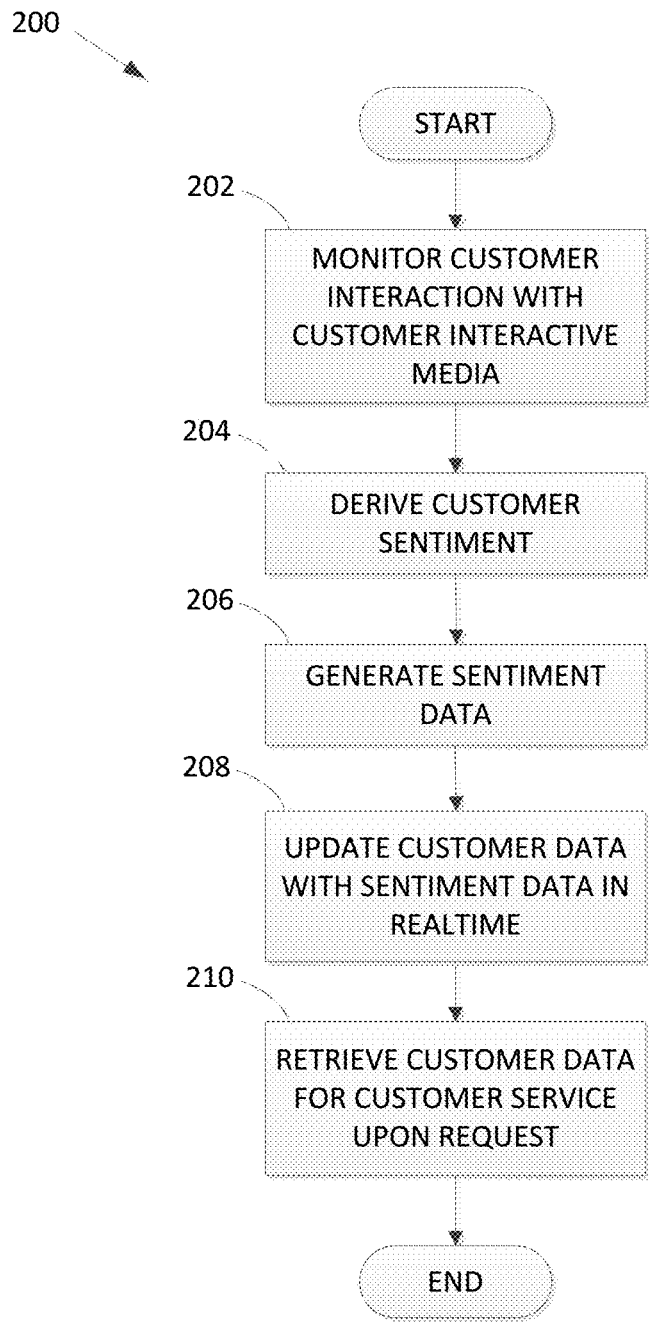
FIG. 3 is a flowchart that illustrates an example method of operating a customer sentiment analysis engine to manage customer sentiment for customer service.

FIG. 3 is a flowchart that illustrates a method 200 of operating the customer sentiment analysis engine 130 to manage customer sentiment for customer service. In some embodiments, the method 200 includes operations 202, 204, 206, 208 and 210.

At the operation 202, the customer sentiment analysis engine 130 operates to monitor an interaction of a customer 104 with customer interactive media 106. In some embodiments, the customer's interaction with the customer interaction media 106 includes online postings on social media sites, which are operated by social media computing devices 118. Such online postings include the customer's review of the products and/or services provided by the business entity 102 and other comments on the customer's experience in the course of the transaction associated with the business entity 102. In other embodiments, the customer's interaction includes telephone conversations or online chatting between the customers 104 and the customer service center 120. In some embodiments, the customer sentiment analysis engine 130 monitors the customer's interaction with the customer interaction media 106 in real-time. As illustrated below, in some embodiments, the operation 202 is performed by a monitoring engine 302 of the customer sentiment analysis engine 130. An example of the monitoring engine 302 is described and illustrated with reference to FIG. 4.

At the operation 204, the customer sentiment analysis engine 130 operates to derive a sentiment of the customer 104 from the interaction of the customer with the customer interaction media 106. For example, the customer sentiment analysis engine 130 is configured to analyze the online postings, the telephone conversations, and/or the online chatting and infer the customer's sentiment associated with the products and/or services provided by the business entity 102. The customer sentiment analysis engine 130 processes languages and text to identify and understand customer feelings and attitudes toward the products and/or services of the business entity 102.

At the operation 206, the customer sentiment analysis engine 130 operates to generate sentiment data associated with the monitored customer 104. In some embodiments, the sentiment data includes the customer's feelings or attitudes toward the products and/or services purchased or toward the business entity 102 in general.

The operations 204 and 206 can be performed by a derivation engine 306 of the customer sentiment analysis engine 130, as described below. An example of the derivation engine 306 is described and illustrated with reference to FIG. 4.

At the operation 208, the customer sentiment analysis engine 130 operates to update the customer data in the customer database 128 with the sentiment data in real-time. In some embodiments, the customer sentiment analysis engine 130 associates the sentiment data with the existing customer data and stores the sentiment data in a proper location of the database 128.

At the operation 210, the customer sentiment analysis engine 130 operates to retrieve the customer data, which includes the associated sentiment data, from the customer database 128 upon a retrieval request from the service employees 114.

The operations 208 and 210 can be performed by a database interaction engine 308 of the customer sentiment analysis engine 130, as described below. An example of the database interaction engine 308 is described and illustrated with reference to FIG. 4.

Figure 4:
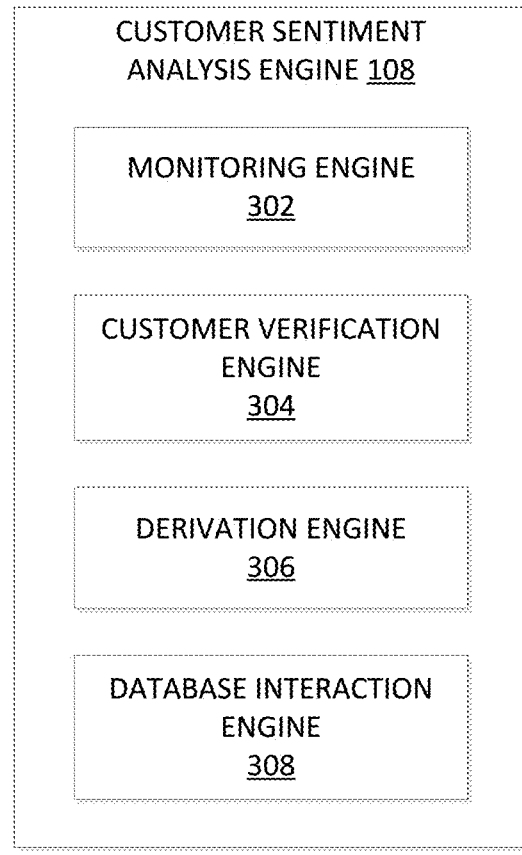
FIG. 4 is a schematic diagram of an example customer sentiment analysis engine.

FIG. 4 is a schematic diagram of an example customer sentiment analysis engine 130. In some embodiments, the customer sentiment analysis engine 130 includes a monitoring engine 302, a customer verification engine 304, a derivation engine 306, and a database interaction engine 308.

The monitoring engine 302 operates to monitor a customer's interaction with customer interaction media 106, such as reviews, comments, statements, tweets, hashtags, or other social media handles, in the online postings of the social media sites (operated by the social media computing devices 118) or in the conversations with service agents of the customer service centers 120. For example, the customer's interaction with the customer interactive media 106 includes at least one social media post generated by the customer 104 on a social media site. In other embodiments, the monitoring engine 302 can track the browsing history of the customer 104 on the customer interaction media 106, such as websites or mobile applications provided by the business entity 102.

In some embodiments, the monitoring engine 302 obtains the online postings and/or the conversations that are relevant to the products and/or services provided for the customer 104 by the business entity 102, and/or the business entity 102 itself. For example, the monitoring engine 302 detects, among others postings, the customer's statements or comments about the goods the customer purchased or the services provided by the business entity 102.

In some embodiments, the monitoring engine 302 is configured to only access and monitor the customer interactive media 106 associated with target customers 104. The target customers 104 are customers of which the business entity 102 is interested in deriving the customer sentiment for customer service. In some embodiments, the monitoring engine 302 accesses social media sites associated with the target customers 104.

In some embodiments, the monitoring engine 302 employs statistics and natural language processing techniques to automate sentiment analysis on a large amount of social media data. The natural language processing techniques are configured to analyze, understand, and generate languages that humans use naturally. In other embodiments, the monitoring engine 302 is configured to determine the customer's interaction, such as the statements and comments, which matches a predetermined search parameter. For example, the monitoring engine 302 searches the online postings or the telephone conversations that include the name or other identifications of the business entity 102 or its products and services, such as product/service names. Another example of a search parameter is a hashtag associated with the business entity. An example operation of the monitoring engine 302 is described with reference to FIG. 5.

The customer verification engine 304 operates to verify an identity of the customer 104 based upon customer data stored in a customer database. In some embodiments, the customer verification engine 304 operates to determine whether profile information of the customer associated with the customer interactive media 106 matches the customer data in the customer database 128. If at least some of the profile information of the customer in the customer interactive media 106 matches at least some of the customer data in the customer database 128, the customer of the customer interactive media 106 is identified as the customer 104 of the business entity 102, and thus the monitoring engine 302 continues to, or begins to, monitor the customer's interaction with the customer interactive media 106.

The derivation engine 306 operates to derive customer sentiment from the detected customer interactions with the customer interactive media 106 and generate sentiment data about the customer sentiment over the products and services provided for the customer 104. In some embodiments, the derivation engine 306 operates to classify the polarity (positive or negative) of a post, comment or statement which determines whether sentiment regarding the provided products and/or services is positive, negative or neutral. In some embodiments, the derivation engine 306 operates to generate a predictive model for customer service based upon the sentiment data in real-time. The predictive model is configured to suggest possible actions that can be taken for the customer. An example operation of the derivation engine 306 is described with reference to FIG. 6.

The database interaction engine 308 operates to interact with the customer database 128 and update the customer data therein with the sentiment data in real-time. The database interaction engine 308 also operates to retrieve the customer data including the sentiment data so that the service employees 114 refer to the customer data for improved customer service. An example operation of the database interaction engine 308 is described with reference to FIG. 7.

Figure 5:
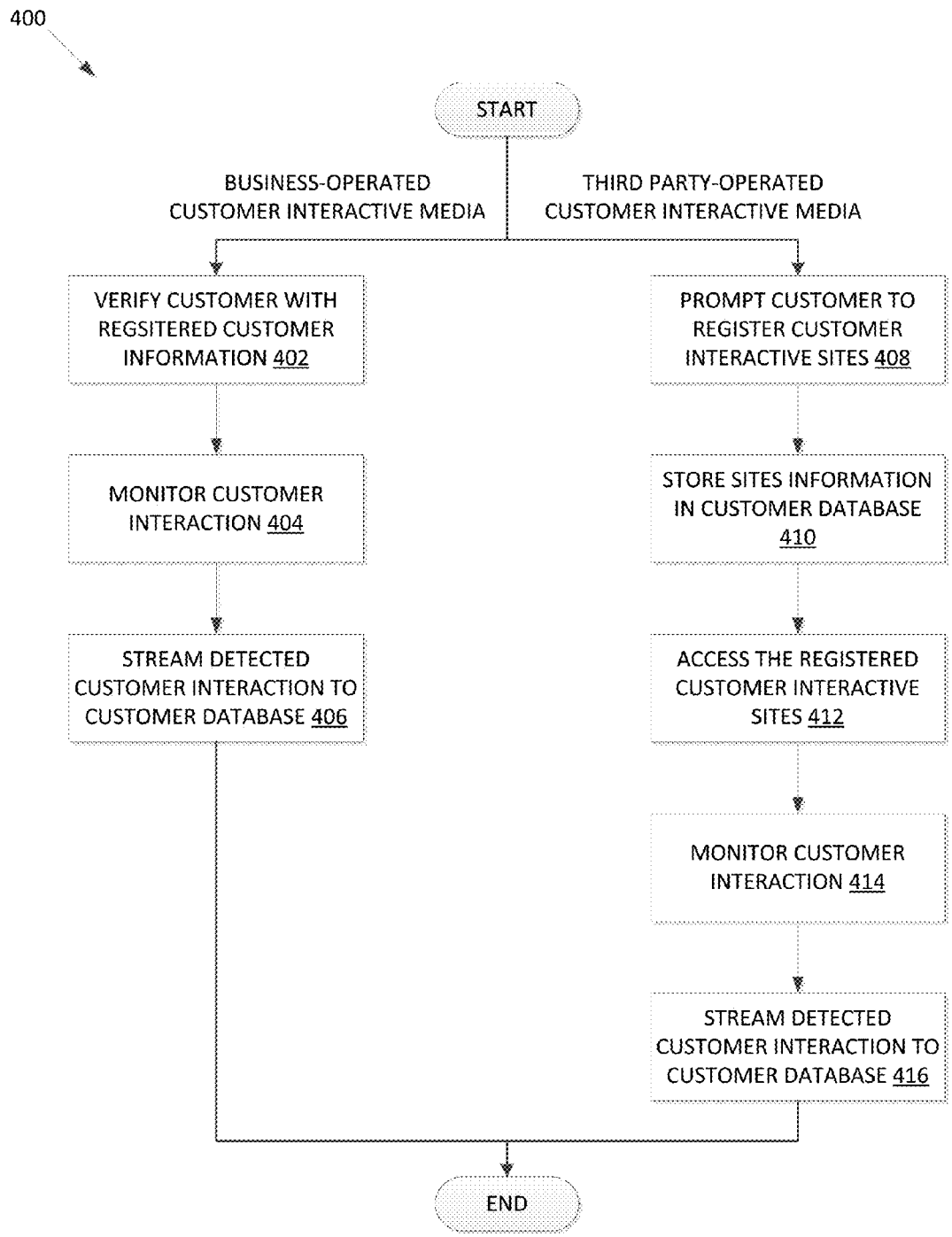
FIG. 5 is a flowchart that illustrates an example method of operating a monitoring engine of FIG. 4.

FIG. 5 is a flowchart that illustrates an example method 400 of operating the monitoring engine 302 of FIG. 4. In some embodiments, the method 400 includes operations 402, 404, 406, 408, 410, 412, 414 and 416.

The monitoring engine 302 can operate to monitor either the customer interactive media 106 owned and/or operated by the business entity 102 (e.g., the company's own websites, blogs or customer service centers 120) or the customer interactive media 106 operated by third parties (e.g., social media sites, such as Facebook™ or Twitter™), or both.

When the monitoring engine 302 monitors the business-operated customer interactive media 106, at the operation 402, the monitoring engine 302 verifies the customer 104 who has accessed the media 106, using the customer information registered for the customer 104 in the customer database 128.

Once the customer 104 is verified, at the operation 404, the monitoring engine 302 monitors the customer's interaction with the customer interactive media 106 by screening the customer's statements, comments, reviews, tweets, hashtags, or other social media handles, which are relevant to the subject products and/or services and are posted on the business-operated websites or blogs.

At the operation 406, the monitoring engine 302 operates to stream the detected customer interactions, which are relevant to the provided products and/or services, into the customer database 128.

Where the monitoring engine 302 monitors the third party customer interactive media 106, at the operation 408, the monitoring engine 302 prompts the customer 104 to register information about the customer interactive media 106 associated with themselves. As a result, the monitoring engine 302 operates to receive a request of the customers 104 to register information about the customer interactive media 106. The information about the customer interactive media 106 can be registered at various stages. For example, the customer 104 can enter or update his or her social media sites or handles when the customer signs up for a new account in websites or blogs operated by the business entity 102 or when the customer edits his or her account information or profile in the business-operated websites or blogs.

At the operation 410, the monitoring engine 302 stores the information about the customer interactive media 106 in the customer database 128 by associating the information with other information about the customer 104. Examples of the information about the customer interactive media 106 include a customer interactive media address, username, email address, and phone number.

At the operation 412, the monitoring engine 302 operates to access the customer interactive media 106 that are registered in the customer database 128. For example, the monitoring engine 302 can access the customer's social media sites based upon the registered information about the social media sites.

At the operation 414, the monitoring engine 302 operates to monitor the customer interaction with the customer's social media sites by screening the customer's statements, comments, reviews, tweets, hashtags, or other social media handles. In some embodiments, the customer's interactions that are relevant to the subject products and/or services are monitored by the monitoring engine 302. The monitoring engine 302 may also monitor the customer's statements expressing sentiments toward the business entity 102 in general.

At the operation 416, the monitoring engine 302 operates to stream the detected customer interactions, which are relevant to the provided products and/or services, into the customer database 128.

Figure 6:
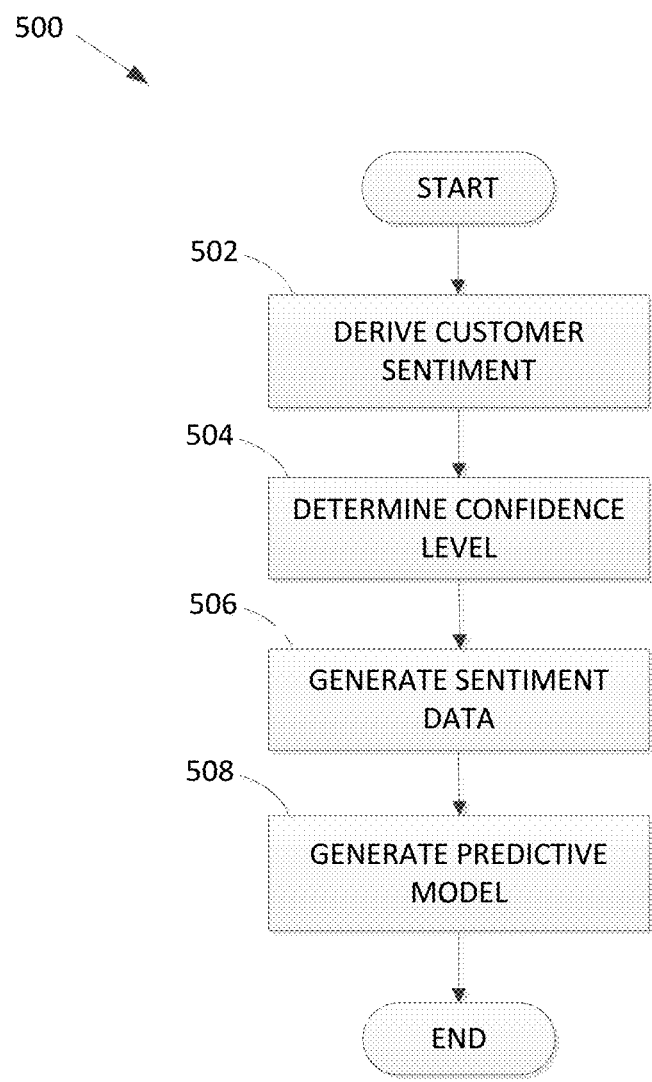
FIG. 6 is a flowchart that illustrates an example method of operating a derivation engine of FIG. 4.

FIG. 6 is a flowchart that illustrates an example method 500 of operating the derivation engine 306. In some embodiments, the method 500 includes operations 502, 504, 506, and 508.

At the operation 502, the derivation engine 306 operates to derive the customer sentiment from the detected customer interactions with the customer interactive media 106. In some embodiments, the derivation engine 306 measures the customer's feelings or attitudes (e.g., positive, negative or neutral) toward business entity 102 and/or the products and/or services purchased or provided by the business entity 102. Further, the derivation engine 306 can categorize the customer interactions as positive, negative or neutral responses to the business entity 102, or products and/or services provided for the customer 104.

In some embodiments, the derivation engine 306 employs automated natural language processing technique to extract meanings of the customer interaction (e.g., statements or comments) and derive the type of sentiment from the meaning. The derivation engine 306 is configured to learn more about the customer 104 based upon the pattern that the engine 306 has seen over time, thereby producing more accurate result of the customer sentiment.

At the operation 504, the derivation engine 306 operates to determine the confidence level of the derived customer sentiment. The confidence level is configured to show the level of accuracy of the customer sentiment automatically derived by the derivation engine 306. In some embodiments, the confidence level can be processed automatically. In other embodiments, the derived customer sentiment is reviewed manually and the confident level is assigned for each customer sentiment.

At the operation 506, the derivation engine 306 operates to generate sentiment data about the derived customer sentiment. In some embodiments, the sentiment data includes the confidence level.

At the operation 508, the derivation engine 306 operates to generate a predictive model for customer service based upon the sentiment data in real-time. The predictive model is configured to intelligently suggest possible actions that can be taken for the customer. In some embodiments, the service employees 114 refer to the predictive model and perform individualized customer service for the customer 104 based on the suggested actions. The predictive model can be incorporated in the sentiment data generated at the operation 506.

Figure 7:
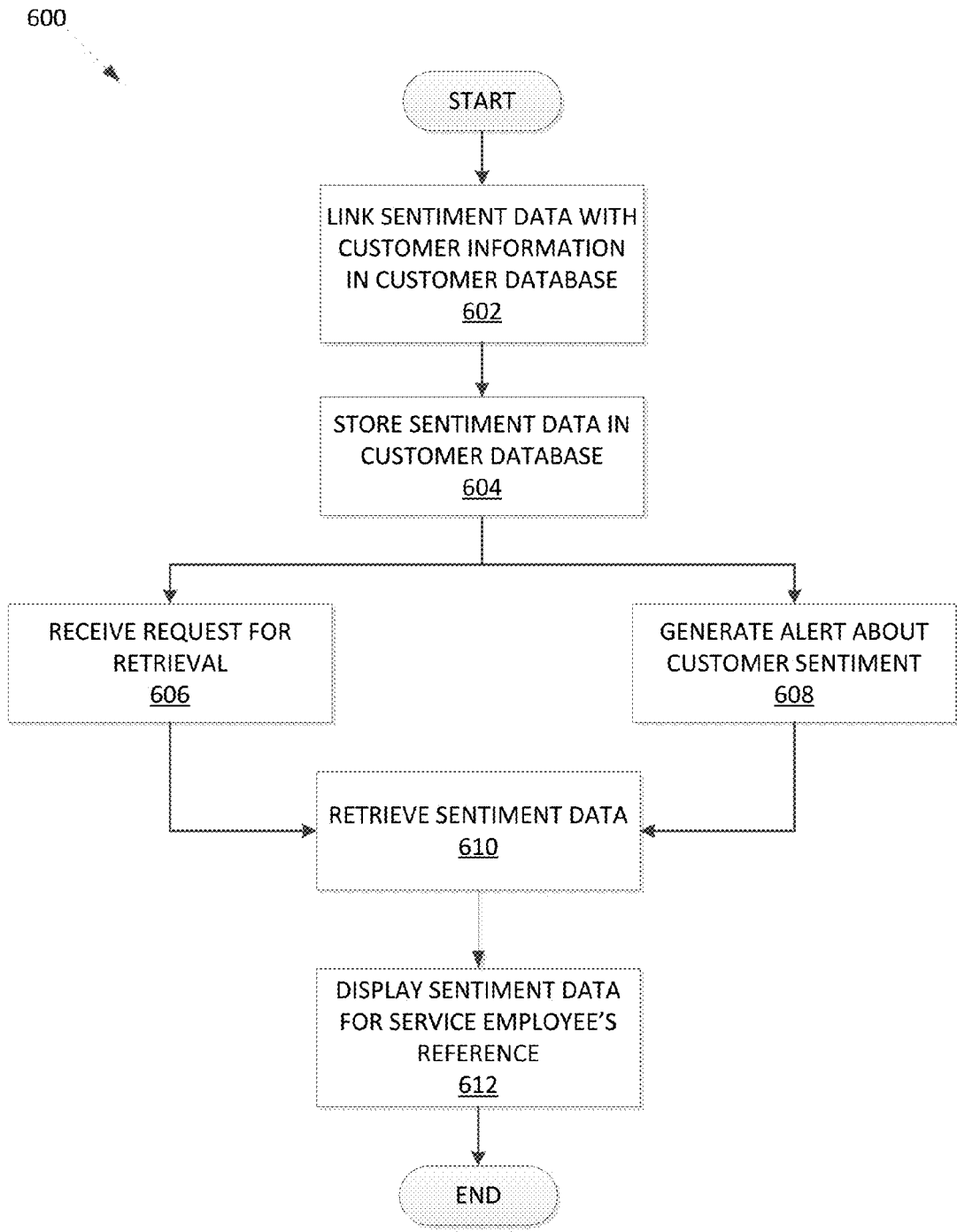
FIG. 7 is a flowchart that illustrates an example method of operating a database interaction engine of FIG. 4.

FIG. 7 is a flowchart that illustrates an example method 600 of operating the database interaction engine 308. In some embodiments, the method 600 includes operations 602, 604, 606, 608, 610, and 612.

At the operation 602, the database interaction engine 308 operates to associate the sentiment data with the customer information or data stored in the customer database 128. In some embodiments, the database interaction engine 308 searches the customer information associated with the customer 104 so that the sentiment data of the customer 104 is linked to the customer information for the customer 104.

At the operation 604, the database interaction engine 308 operates to store the sentiment data in an appropriate place of the customer database 128. For example, the sentiment data is stored in the customer database 128 so as to be connected to the associated customer information therein.

At the operation 606, the database interaction engine 308 operates to receive a request to retrieve the customer data from the customer database 128. In some embodiments, the customer data includes the sentiment data for the customer 104. In some embodiments, the request is made by the service employees 114 who want to use the customer data to provide individualized customer surface for the customer 104.

Alternatively, or in addition, at the operation 608, the database interaction engine 308 operates to generate an alert that informs the service employees 114 of sentiment data unique to a particular customer 104 in real-time. The service employees 114 can then decide the next best actions to provide customer service for the customer 104 instantaneously based upon the alert.

At the operation 610, the database interaction engine 308 operates to retrieve the customer data including the sentiment data from the customer database 128.

At the operation 612, the database interaction engine 308 operates to display the retrieved customer data (including the sentiment data) so that the service employees 114 refer to the data and perform customized or individualized customer service for each customer 104. Using the sentiment data, the service employees 114 can take appropriate actions when they communicate with the customer 104 who visits the business place or contacts the customer service centers.

As such, the customer sentiment analysis engine 130 processes and provides the customer sentiment data in a real-time, seamless manner, and allows the service employees 114 to share the customer sentiment data in a single, integrated channel through the customer service computing device 108, which internally connects a number of the service employees 114 located in different places.

In some embodiments, the customer sentiment analysis engine 130 can operate to monitor the customer's interaction with the customer interactive media 106 of competitor businesses to search for opinions, reviews, posts, and tweets around the competition. Using the sentiment data derived about the competition products and services, the business entity 102 can solicit the competitor's customers or offer similar products for them.

In some embodiments, the customer sentiment analysis engine 130 operates to identify the interaction of influential people with the customer interactive media 106, and can weight sentiments expressed by these influential customers appropriately. For example, the sentiment expressed by a consumer analyst for a particular industry can be weighed more heavily than the sentiment expressed by an ordinary customer. Alerts can be generated and escalated appropriately. For example, an alert can be generated when the system derives a neutral and/or negative sentiment for an influential customer so that remediate actions can be taken immediately. Other configurations are possible.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of managing customer sentiment, the method comprising:
   selecting a customer from a plurality of customers, the customer having an influence over a desired industry;
   monitoring an interaction of the customer with customer interactive media;
   deriving sentiment of the customer from the interaction of the customer with the customer interactive media;
   determining a confidence level of the derived sentiment of the customer, wherein the confidence level indicates an accuracy of the derived sentiment;
   allowing for manual review and assignment of the derived sentiment;
   generating sentiment data for the customer using the sentiment;
   updating customer data in a customer database with the sentiment data;
   weighting the sentiment data associated with the customer having the influence more highly than other sentiment data for other customers;
   generating a predictive model for customer service based upon the sentiment data, the predictive model being configured to suggest possible actions to be taken for the customer; and
   incorporating the predictive model into the generated sentiment data;
   wherein based on a negative derived sentiment from the sentiment data, the predictive model comprises one or more actions to improve the sentiment of the customer.

2. The method of claim 1, further comprising:
   receiving a request for registering information about the customer interactive media; and
   storing the information about the customer interactive media in the customer database.

3. The method of claim 2, wherein the information about the customer interactive media is at least one selected from a customer interactive media address, username, email address, and phone number.

4. The method of claim 1, further comprising:
   verifying an identity of the customer based upon customer data stored in a customer database.

5. The method of claim 4, wherein verifying the identity of the customer includes determining profile information of the customer in the customer interactive media that matches with the customer data in the customer database.

6. The method of claim 1, wherein the customer interactive media includes social media and customer service centers.

7. The method of claim 1, wherein the interaction of the customer with the customer interactive media includes at least one social media post generated by the customer on a social media.

8. The method of claim 7, wherein monitoring the interaction of the customer with the social media includes detecting the social media post relevant to a predetermined service provided for the customer.

9. The method of claim 1, wherein monitoring the interaction of the customer with the customer interactive media includes determining the customer's interaction that matches a predetermined search parameter.

10. The method of claim 1, further comprising:
    receiving a request of an operator for retrieving the customer data from the customer database; and
    displaying the customer data including the sentiment data to the operator.

11. The method of claim 1, further comprising:
    generating an alert to an operator, the alert including information about the sentiment data for the customer in real-time.

12. A system for managing customer sentiment for customer service, the system comprising:
    a processing device configured to control a sentiment analysis engine;
    a customer database configured to store customer data; and
    a computer readable storage device storing software instructions that, when executed by the processing device, cause the sentiment analysis engine to:
      select a customer, the customer being influential in a specific industry;
      monitor an interaction of a customer with customer interactive media;
      derive a derived sentiment of the customer from the interaction of the customer with the customer interactive media;
      determine a confidence level of the derived sentiment of the customer, wherein the confidence level indicates an accuracy of the derived sentiment;
      allow for manual review and assignment of the derived sentiment;
      generate sentiment data for the customer using the derived sentiment;
      weight the sentiment data for the customer more highly than other sentiment data for other customers;
      update customer data in the customer database with the sentiment data;
      generate a predictive model for customer service based upon the sentiment data, the predictive model being configured to suggest possible actions that can be taken for the customer, wherein, based on a negative derived sentiment from the sentiment data, the predictive model comprises one or more actions to improve the derived sentiment of the customer;
      incorporate the predictive model into the generated sentiment data;
      receive a request to retrieve the customer data upon the customer visiting a place of business; and
      display the customer data to a service employee so that the service employee can take the one or more actions when interacting with the customer at the place of business.

13. The method of claim 1, further comprising:
    receiving a request to retrieve the updated customer data; and
    displaying the updated customer data.

14. The system of claim 12, wherein the software instructions further cause the sentiment analysis engine to:
    receive a request for registering information about the customer interactive media; and
    store the information about the customer interactive media in the customer database.

15. The system of claim 12, wherein the software instructions further cause the sentiment analysis engine to:

verify an identity of the customer based upon customer data stored in a customer database.

16. The system of claim 12, wherein the software instructions further cause the sentiment analysis engine to:
detect a customer interactive media post generated by the customer and relevant to a predetermined service provided for the customer.

17. The system of claim 12, wherein the software instructions further cause the sentiment analysis engine to:
receive a request of an operator for retrieving the customer data from the customer database; and
display the customer data including the sentiment data to the operator.

18. The system of claim 12, wherein the software instructions further cause the sentiment analysis engine to:
generate an alert to a business operator, the alert including information about the sentiment data for the customer in real-time.

* * * * *